(12) United States Patent
Schmidt et al.

(10) Patent No.: US 11,969,942 B2
(45) Date of Patent: Apr. 30, 2024

(54) TRANSPORTABLE ASSEMBLY UNIT FOR AN ADDITIVE MANUFACTURING DEVICE

(71) Applicants: DENTSPLY SIRONA inc., York, PA (US); SIRONA DENTAL SYSTEMS GMBH, Bensheim (DE)

(72) Inventors: Christian Schmidt, Bensheim (DE); Thomas Hasenzahl, Darmstadt (DE)

(73) Assignee: DENTSPLY SIRONA INC., York, PA (US)

( * ) Notice: Subject to any disclaimer, the term of this patent is extended or adjusted under 35 U.S.C. 154(b) by 5 days.

(21) Appl. No.: 17/431,456

(22) PCT Filed: Feb. 28, 2020

(86) PCT No.: PCT/EP2020/055325
§ 371 (c)(1),
(2) Date: Aug. 17, 2021

(87) PCT Pub. No.: WO2020/174092
PCT Pub. Date: Sep. 3, 2020

(65) Prior Publication Data
US 2022/0134657 A1     May 5, 2022

(30) Foreign Application Priority Data

Feb. 28, 2019  (EP) .................................. 19160123

(51) Int. Cl.
*B29C 64/25*  (2017.01)
*B29C 64/129*  (2017.01)
(Continued)

(52) U.S. Cl.
CPC ............ *B29C 64/25* (2017.08); *B29C 64/129* (2017.08); *B29C 64/255* (2017.08);
(Continued)

(58) Field of Classification Search
CPC .............................. B29C 64/25; B29C 64/255
See application file for complete search history.

(56) References Cited

U.S. PATENT DOCUMENTS

| 5,950,644 A | 9/1999 | Brewer |
| 2009/0283109 A1 | 11/2009 | Moussa |

(Continued)

FOREIGN PATENT DOCUMENTS

| EP | 3354442 A1 | 8/2018 |
| FR | 3050956 A1 | 11/2017 |

(Continued)

OTHER PUBLICATIONS

International Search Report; PCT/EP2020/055325; May 12, 2020 (completed); May 25, 2020 (mailed).

(Continued)

*Primary Examiner* — Timothy Kennedy
(74) *Attorney, Agent, or Firm* — DENTSPLY SIRONA INC.

(57) ABSTRACT

Component carrier for an additive manufacturing device, wherein the component carrier comprises a construction surface, on which a component to be manufactured is disposed during the operation of the manufacturing device, wherein the component carrier comprises a sealing surface which radially surrounds the construction surface, and method for post-processing a component manufactured according to an additive manufacturing process using such a component carrier.

8 Claims, 5 Drawing Sheets

(51) Int. Cl.
*B29C 64/255* (2017.01)
*B29C 64/264* (2017.01)
*B29C 64/295* (2017.01)
*B29C 64/35* (2017.01)
*B29C 64/371* (2017.01)
*B33Y 10/00* (2015.01)
*B33Y 30/00* (2015.01)
*B33Y 40/20* (2020.01)

(52) U.S. Cl.
CPC .......... *B29C 64/264* (2017.08); *B29C 64/295* (2017.08); *B29C 64/35* (2017.08); *B29C 64/371* (2017.08); *B33Y 10/00* (2014.12); *B33Y 30/00* (2014.12); *B33Y 40/20* (2020.01)

(56) References Cited

U.S. PATENT DOCUMENTS

| 2018/0001557 A1* | 1/2018 | Buller | B33Y 50/02 |
| 2018/0111319 A1* | 4/2018 | Brezoczky | B29C 64/255 |
| 2018/0133966 A1* | 5/2018 | Plachner | B22F 12/82 |
| 2020/0254526 A1* | 8/2020 | Huber | B22F 12/38 |

FOREIGN PATENT DOCUMENTS

| WO | 2017091913 A1 | 6/2017 |
| WO | 2018226164 A2 | 12/2018 |

OTHER PUBLICATIONS

Written Opinion of the International Searching Authority; May 12, 2020 (completed); May 25, 2020 (mailed).
International Preliminary Report on Patentability; May 12, 2020 (completed); May 25, 2020 (mailed).

* cited by examiner

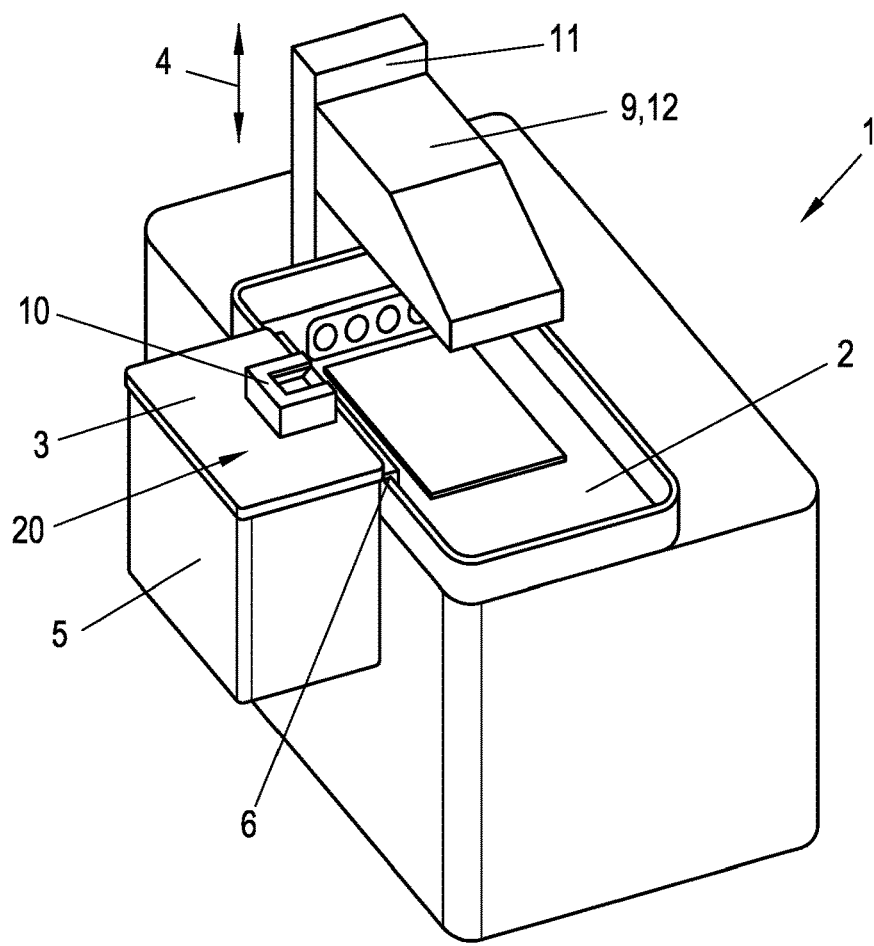
Fig. 1
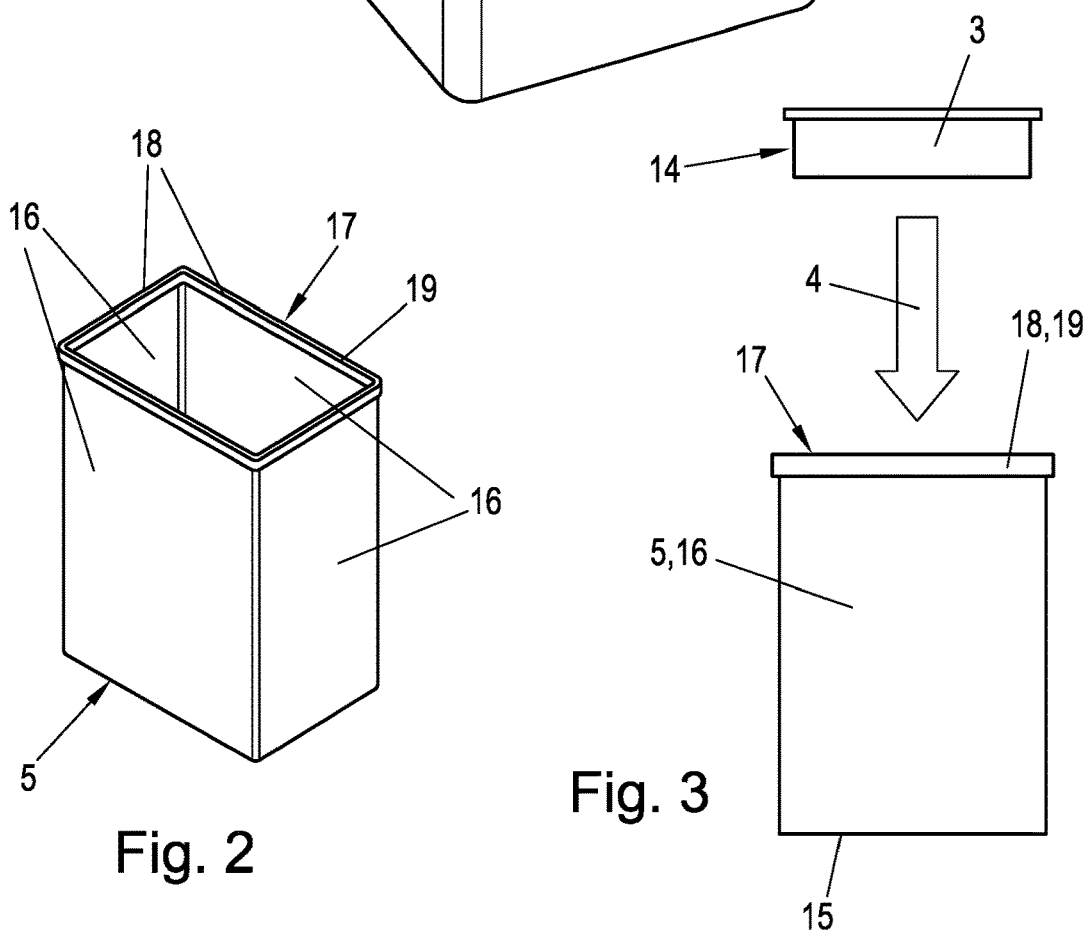
Fig. 2
Fig. 3

TRANSPORTABLE ASSEMBLY UNIT FOR AN ADDITIVE MANUFACTURING DEVICE

CROSS-REFERENCE TO RELATED APPLICATIONS

This patent application is a National Phase application of International Application No. PCT/EP2020/055325 filed Feb. 28, 2020, which claims the benefit of and priority to European Patent Application Number 19160123.6 filed on Feb. 28, 2019, which are herein incorporated by reference for all purposes.

TECHNICAL FIELD

The invention relates to a component carrier for an additive manufacturing device, wherein the component carrier comprises a construction surface on which a component to be manufactured is disposed during the operation of the manufacturing device. The invention further relates to a manufacturing system having one or more workstations for washing and/or drying and/or post curing a component. Lastly, the invention relates to a method for post-processing a component manufactured according to an additive manufacturing process.

BACKGROUND

The part of an additive manufacturing system on which the component to be manufactured is created, e.g. to which a first layer of the component is connected, is referred to as a component carrier (or also a build platform).

The material selection for the printable area of the component carrier (also referred to in the following as the "construction surface") is a crucial factor for an adequate adhesion of the components. The polarity of the surface of the component carrier is critical to the initial adhesion of the component. From the state of the art, it is already known that stainless steel, anodized aluminum or aluminum exhibit the best adhesion of adhesives with comparable adhesion mechanisms. The adhesion of the component can additionally be improved by a roughened surface structure. A surface structure such as one created by sand blasting, for example, is advantageous in this case. Photopolymers are not only radically cured, but also cationically. This means that the metal alloy selected for component carriers should be free of ion donors, such as copper.

The manufacturing system can be a post-processing system, for example, that is used for post-processing a previously manufactured component. After the completion of the additive manufacturing, the manufactured component (or generally the manufactured object) is typically connected to the component carrier, more specifically to the construction surface, directly and/or via support structures. After the manufacturing and shaping process, the created component is run out of a resin bath, for example, so that the surface of the created component can be wetted with liquid photopolymer resin. At this point in time, therefore, the created component has been solidified (for shaping), but perhaps not yet completely cured.

For the final material properties, additively manufactured components are usually washed once to twice in a solvent (e.g. IPA, ethanol or a surfactant solution), dried and post cured by UV light and/or heat, and lastly mechanically "finished" (e.g. any support structures are removed). For the mentioned post-processing steps (or post-processes), the components have to be handled manually. Since both the used photopolymers and the possible solvents can be harmful chemicals, the use of protective equipment to prevent direct eye, skin and airway contact is recommended.

The handling of not cured photopolymers also requires special requirements on the surroundings, which should ideally be UV-free so that unwanted curing of resin residues does not occur.

This can in particular be the case for the manual removal of the resin-wetted components from the manufacturing device. Dripping resin residues can permanently soil both the manufacturing device and the immediate work area, as well as the path from the manufacturing device to the location where the post-processes are performed.

Some photopolymer resins are also very odorous, which can likewise lead to irritations.

In addition, to ensure specific material properties for safety-critical applications, for example for the production of biocompatible dental objects, the process description given by the manufacturer must be followed as closely as possible, without the option of a parameterizable implementation of the post-processes, the setting of the material properties guaranteed by the material manufacturer is strongly dependent on the qualification and diligence of the user, the risk of which is difficult to assess.

The following variants for the implementation of the post-processes of additively manufactured components are currently available: first, manual washing and drying and subsequent post-exposure in a specialized post-exposure device; second, machine-assisted washing, subsequent manual drying and subsequent post-exposure in a specialized post-exposure device; and third, machine-assisted washing and drying and subsequent post-exposure in a specialized post-exposure device. The first variant requires only one device in addition to the manufacturing device, but is at the same time particularly reliant on the careful manual execution of the first two post-processes. The second and third variants both require at least two additional devices and a manual transfer between the additional devices.

A manufacturing system with a number of processing stations and exchangeable containers conveyed in between using conveyor carriages or conveyor belts has already been shown in DE 10 2014 007 408 A1. However, a sealing of the exchangeable containers is not disclosed. A component transported in an exchangeable container therefore has to be removed from the exchangeable container for post-processing in any case.

EP 1 769 904 B1 shows a build platform, which is detachably coupled to a lifting device and which is immersible into a vat of a manufacturing device. Consequently, the build platform cannot cover or seal the vat.

U.S. Pat. No. 7,556,490 B2 shows a manufacturing system having a number of workstations for different tasks. Different washing and curing areas can be reached with a movable build platform. Vats and enclosures, into which the build platform is lowered and which enclose the build platform, are provided in the individual stations, as well as cabinets that surround the entire manufacturing system. The space requirement of the manufacturing system is therefore very high compared to the size of the components to be manufactured.

In the context of a generic manufacturing system, US 2009/0283109 A1 shows a container for a manufactured component and a lid that fits said container. The container with the lid is radiation-transmissive and permits the post curing of a component contained therein. They are furthermore intended to protect a component transported therein against damage until post curing. Prior to being accommodated in the container, the component has to be manually separated from a component carrier. After that, the position or orientation of the component in the container cannot be controlled. After receiving the component, the container has to be closed manually with the lid. By its very nature the container is also not suitable for protection against radiation from the environment, which can lead to unintended (e.g. uneven) post curing.

SUMMARY

One object of the invention is to enable a post-processing of a component manufactured by means of additive manufacturing method, wherein the required system boundary should be able to be established in a manner that is as simple, inexpensive and space-saving as possible.

The component carrier according to the invention of the type mentioned at the outset comprises a sealing surface which radially surrounds the construction surface. Here the term "radially" is used to define a relative position and it does not limit the shape of the construction surface or the sealing surface; they may or may not be circular or round. The sealing surface can surround the construction surface completely, for example in the form of a continuous rectangular or round edge or frame. The sealing surface can be positioned on the same geometric plane as the construction surface, but is not restricted to this arrangement. The sealing surface can, for example, be formed by the outer side of the component carrier, or a portion of said outer side, which is arranged vertically in relation to the construction surface that is horizontal during operation. The sealing surface can also extend across and consist of several sections that do not necessarily have to be arranged in a common plane, e.g. a horizontal and a vertical section. The invention is based on the concept of using the existing component carrier at the same time as a part of the system boundary of a closed workspace during post-processing. Therefore, any surface of the component carrier that is suitable for sealing a workspace during post-processing can function as a sealing surface. The sealing surface can, for example, be configured to rest against a corresponding sealing surface or a corresponding sealing element or a seal, which is, for example, connected to a container or to a chamber. After manufacturing (i.e. shaping), the component carrier (or the build platform) can be placed onto a container, for example, and at the same time close the container. In the case of a seal, e.g. by means of a sealing element or a sealing layer, on a container or on a chamber, the sealing surface of the component carrier is a surface which, in a closed state of the container or the chamber, rests against the seal. The sealing surface is a part of the surface of the component carrier. The material of the component carrier can be the sane material in the area of the sealing surface as away from the sealing surface; i.e. the sealing surface does not necessarily require a special sealing material on the component carrier. A sealing element and/or sealing material tailored to the sealing surface can, for example, be provided on a container or a chamber. As a result of its arrangement on the component carrier, the sealing surface is always moved together with the construction surface.

The component carrier can be UV-opaque, for example. In that case, the component carrier can serve as a system boundary during optical post curing using UV radiation. The sealing surface is thereby used as a UV-tight closure of a workspace for post curing. The escape of UV radiation from the workspace can be thus prevented, which could otherwise lead to unwanted curing of resin residues outside the workspace.

On a side facing away from the construction surface, the component carrier can further comprise a mechanical interface for a releasable connection with a transport device. The transport device can, for example, be configured for vertical transport of the component carrier (as a "z-tower") or for both vertical and horizontal transport of the component carrier (as an "x-z-tower" or "y-z-tower") and, for example, comprise corresponding drives.

According to one exemplary embodiment, the component carrier closes a container, wherein the sealing surface of the component carrier together with a corresponding sealing surface of the container seals against an escape of a photoreactive resin and/or a washing fluid and/or uv radiation from the container. The seal achieved by the two corresponding sealing surfaces can generally also (or instead) protect against an unwanted entry and/or escape of air or other gases into the container or from the container. The volume of the container is dimensioned such that the maximum creatable object volume from the additive manufacturing process can be accommodated therein. In this case, the container and the component carrier form a single manageable unit. The container can, for example, function as a transport vessel (clean, safe, optionally UV-tight).

The container can further comprise at least one connection for a supply line and at least one connection for a discharge line for a washing fluid (see the abovementioned solvents) and/or a drying gas (e.g. air or nitrogen). The container, which is tightly closed with the aid of the component carrier, can thus enclose a workspace for washing and/or drying manufactured components. The term container is not restricted to objects that are particularly suitable for transporting, but is more generally to be understood as a system boundary and receptacle, for instance also of a chamber of a manufacturing system, with the at least one connection, however, a transport container can, for example, also be used as a process chamber for the post-processes washing and/or drying and/or post curing to be carried out.

For transport applications, it is particularly beneficial if the container is UV-opaque. Together with a likewise UV-opaque component carrier that functions as a lid for the container, a negative effect of ambient radiation can largely be excluded. It can optionally also be possible to see inside the container, i.e. the container can be transparent to visible light, so that a component accommodated therein can be seen.

It can be provided that the container is only partially UV-transparent. It is, for example, conceivable that only individual sections of a container wall are UV-transparent, so that, when the container is accommodated in a manufacturing system equipped with UV light sources, the UV-transparent sections are arranged in the area of the UV light sources, so that, a component held in the container can be post cured quickly and reliably with a minimum risk of damage.

The container can further comprise one or more mechanical interfaces for connecting to a manufacturing device or generally with a workstation. Connecting elements for a form-fitting connection can be provided as mechanical interfaces, for example, e.g. for a pin connection, bolt connection, key joint or a tongue-and-groove connection.

The invention further relates to a manufacturing system or "post-processing system" having one or more workstations for washing and/or drying and/or post curing a component, wherein the manufacturing system comprises a component carrier according to one of the variants described above. The manufacturing system can be a system for post-processing a component manufactured by means of an additive manufacturing process. At least one post-processing step (or post-process) can be executable by the manufacturing system. The post-processing step(s) can respectively be assigned to at least one workstation. The manufacturing system can consequently include a washing station (a workstation for washing a component) and/or a drying station (a workstation for drying a washed component, for example) and/or a post curing station (a workstation for post curing a component). It is also conceivable for several post-processing steps to be carried out in one workstation. Independent of the assignment between post-processing step and workstation, such a manufacturing system can enable an integration of several or all of the post-processes in one single device. The component carrier can be functionally used in at least one workstation, i.e. participate in the post-processing step and cooperate with the proper execution of said post-processing step. In the further sequence, several or ail of the post-processes in a device can be parameterized consistently and reproducibly, e.g. according to the specifications of a material manufacturer.

In the context of such a manufacturing system, the manufacturing system can include a container according to one of the above described variants, i.e. a container that is sealed by a component carrier of the present type. If the container is a container with connections for different media such as a drying gas and/or a washing fluid, the manufacturing system can provide the media required for post-processing.

If the manufacturing system includes a transport device, the component carrier can be connectable to the transport device. The component carrier can optionally be connected with the transport device, for example, releasably connected. In this way, a component possibly manufactured on the component carrier can be transported between different workstations with the aid of the transport device, and/or the transport device can move the component carrier between a sealing position, in which the component carrier seals a container, and an open position, in which the component carrier is removed from the container, and thus achieve a reproducible positioning of the component in the container.

In the above case, it can be provided that the connection of the component carrier to the transport device can be established and released by means of a gripper device. The transport device can thus be released from the component carrier and the component carrier can be removed from the manufacturing system. The transport device can furthermore be used for the alternating or consecutive transport of several different component carriers.

For movement between different workstations, it is useful if the transport device comprises a drive for horizontal movement. The drive can be an electric motor, for example, more specifically a stepper motor.

According to a further design variant, the manufacturing system can include a manufacturing station having a resin vat and an exposure device with spatial resolution. The manufacturing system can thus not only be used for post-processing, but also for the preceding manufacturing of a component and simultaneously function as a manufacturing device. The manufacturing station can be provided in addition to the one or more workstations, for example. Combining manufacturing and post-processing allows a particularly high degree of integration and automatization, and consequently potentially particularly cost-effective, fast and also safe and reproducible manufacturing.

The manufacturing system can also include additional functional work areas that can be used for loading the component carrier and container as well as dripping off and drying excess solvent. A functional work area for the exactly positioned reception of a transport container and holding of the transport container, for example, can be provided. In that case, a transport container closed by a component carrier and containing a component on said component carrier can be inserted into the respective work area. An automated post-processing process can then be started, wherein a transport device is docked onto the component carrier and subsequently transports the connected component to one or more workstations.

The container of the manufacturing system can optionally be a washing tank and comprise a (e.g. mechanical) stirrer for moving a solvent filled therein. The stirrer (also referred to as an agitator) can be configured, for example, to create a current of a solvent in the washing tank. A lid of the washing tank can furthermore be provided, that is connected to an actuator for automatically opening and closing the lid. This lid can be a component different from the component carrier, wherein the lid prevents the escape of a solvent from the washing tank between washing processes, i.e. when no component is currently being washed.

The manufacturing system can furthermore comprise at least one workstation for post curing a component, wherein this workstation can be configured for optical (e.g. with UV light) and/or thermal (e.g. by means of an integrated, controllable heater) post curing. In this case, the component carrier can be configured for suitable sealing, e.g. against escaping UV light, or as insulation against heat convection and/or heat conduction.

In this context, the workstation can further comprise a shielding gas supply for post curing. The component carrier can interact with the workstation to spatially confine the supplied shielding gas and to achieve a sufficiently high shielding gas concentration in the workstation, more specifically in a workspace.

In the method according to the invention of the type mentioned at the outset, after manufacturing, a component connected to a component carrier is transported to a workspace (the workspace can be e.g. the interior in a container or in a receptacle or chamber of a workstation of a manufacturing system), wherein the component carrier seals the workspace against resin and/or solvent and/or UV radiation.

In the context of the present method, the component can be washed in the workspace sealed by the component carrier. The component carrier seals the workspace against an escape of a washing fluid, e.g. a liquid washing solution with a solvent, when the component to be washed on the component carrier is accommodated in the workspace.

In this context, a washing fluid can be supplied to and removed from the workspace via at least one connection for washing the component. If the workspace is formed by a container, said container can comprise such a connection. In doing so, the connection can seal the workspace before and after washing, for example with a valve. Supply and removal can take place via the same connection or via different connections.

For washing the component, a washing fluid can furthermore be moved with adjustable, changeable directions and speeds relative to the component by moving the washing fluid and/or by moving the component. This can ensure that the surface of the component is washed uniformly largely independent of its form, e.g. with respect to cavities or recesses in the component.

The component can further optionally be dried after washing in a workspace sealed by the component carrier. This workspace can be, but is not necessarily, the same workspace in which the component was previously washed. If the same, continuously sealed workspace is used, a washing fluid can largely be recovered after washing and during drying and then optionally regenerated (filtered and/or prepared).

To dry the component, an air stream can be supplied to and removed from the workspace via at least two connections. In doing so, the air stream is supplied via one connection and at the same time removed via the other connection. An air stream is consequently created in the workspace between the two connections. The connection via which the air stream is supplied can also be formed by undefined leaks in the workspace. Between the incoming connection and the outgoing connection there is a differential pressure which leads to a negative pressure in the workspace. In another embodiment, an activated carbon filter is connected upstream of the outgoing connection. Differential pressure and activated carbon filter ensure that no odors caused by escaping solvent vapors leave the workspace.

In this respect, the air stream created for drying the component can, for example, be moved by a negative pressure between the incoming and the outgoing connection. The use of a negative pressure counteracts an uncontrolled escape of the air being discharged and can, for example, prevent the release of solvent vapors into the environment.

The direction of the air stream can optionally be reversed, so that the roles of the connections switch, and the inlet becomes the outlet and vice versa. In general, drying is not limited to the use of an air stream; in principle any type of gas current can be used. It can further be provided that the pressure in the workspace is reduced for drying, in order to evaporate a washing fluid. For drying, at least one of the connections can be used to remove a drying gas (e.g. air) with increased relative saturation of a washing fluid from the workspace, while a drying gas with a comparatively lower relative saturation of a washing fluid is optionally supplied or fed into the workspace via a second or further connection.

As an alternative or additional post-processing step, it can be provided that the component is post cured in the workspace sealed by the component carrier. During post curing, the structure, or at least one surface (i.e. the outside), of the component is cured completely. A curing of a printed material started during the general manufacturing process can be continued and completed.

Since post curing can be carried out with UV light, for example, the workspace can be illuminated through at least one side wall, for example with UV light, for post curing the component. The relevant side wall can be at least partially transparent to radiation used for post curing (e.g. UV light). The other or some of the other side walls can be opaque to UV light. The side wall which is at least partially transparent to UV light can be a side wall different from the floor of a workspace, e.g. a side wall perpendicular to the floor. Two side walls, e.g. two opposite, substantially parallel side walls, can optionally be used to illuminate the workspace for post curing with respective associated radiation sources (e.g. UV lamps).

Specifically, the workspace can optionally be illuminated by at least two light sources for post curing the component, for example with UV light, and/or equipped with a controllable heater to thermally cure components in the workspace independent of UV light components. During thermal curing, the component, or at least its surface, is warmed or heated, so that the component material cures further either during warming or heating, and/or when holding a temperature and/or during subsequent cooling.

The present disclosure closes a gap between shaping by means of the additive manufacturing process described at the outset and the most desired post-processes: Depending on the embodiment, with the use of the present disclosure for the post-processes: protective equipment does not have to be worn; special room requirements are no longer necessary; no more odors from solvent vapors and photopolymer resins; and/or soiling of the machine and the work environment is reduced or excluded; furthermore, process specifications for material manufacturing can be parametrically implemented more reliably and more safely and a lower qualification of the user is already sufficient.

BRIEF DESCRIPTION OF THE DRAWINGS

The invention is explained in more detail in the following on the basis of exemplary embodiments, to which the invention is not limited, however, and with reference to the drawings. Specifically, the drawings show:

FIG. 1 schematically a manufacturing system having a resin vat and a container sealed by a component carrier in a sealing position;

FIG. 2 schematically a simple open container;

FIG. 3 schematically a side view onto an open container according to FIG. 2 with a component carrier disposed above it in an open position;

FIG. 3 schematically a post curing chamber with an inserted container;

DETAILED DESCRIPTION

Figure 4:
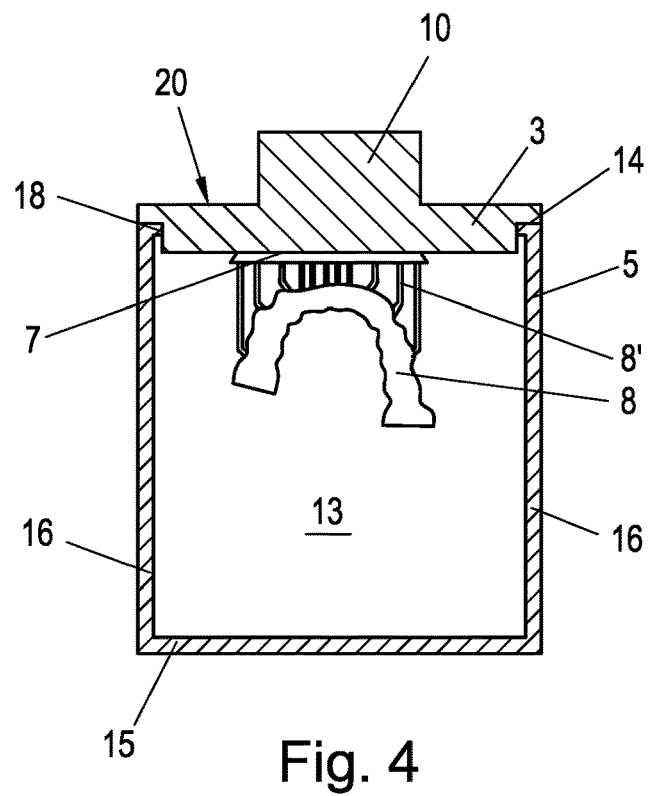
FIG. 4 schematically a vertical section of a closed container, which is sealed by a component carrier and is in a sealing position.

FIG. 1 shows an additive manufacturing device 1 having a resin vat 2 and an exposure device with spatial resolution. The manufacturing device 1 would also be usable as a manufacturing station of a manufacturing system. The additive manufacturing device 1 (a "3D printer") is laser and DLP-based. Liquid photopolymer resins can be processed to solid components in said additive manufacturing device according to the principle of "overhead vat polymerization". Photopolymerization by means of UV light (ultraviolet light) is used as the solidification principle. The UV light is used to project a mask by means of a UV laser or a DMD-based ("digital micromirror device") UV projector. The projected mask also marks the area in the resin bath in the resin vat 2 in which the material solidification occurs. A layer thickness, within which the material curing takes place, is assigned to each mask. For the additive manufacturing, the digital volume model of the component to be printed is disassembled into layers. The mask is repeatedly exposed until all the layers of the object to be printed have been exposed. In order to ensure that the individual layers are not all exposed into one another, a component carrier 3 is moved out of the exposure zone away from the base of the tray in z-direction 4 by at least one layer thickness after each layer cycle.

A container 5, preferably rigid, is attached next to the additive manufacturing device 1. In order to minimize the opportunities for the resin to drip into the machine interior of the manufacturing device 1 as much as possible, said container is positioned as close as possible to the resin-carrying components such as the resin vat 2. The container 5 comprises a mechanical interface 6 for a releasable insertion into the additive manufacturing device 1. After the completion of the additive manufacturing of a component, the component carrier 3 along with the attached, additively manufactured component can be placed onto the container 5 as a lid. The container 5 is then covered and sealed by the removable component carrier 3 of the additive manufacturing device 1. The container 5 and the component carrier 3 thus form a self-contained transportable assembly unit, which can be removed from the manufacturing device 1 without resin contact by the user for transporting to a workstation for post treatment.

The component carrier 3 comprises a construction surface 7 (see FIG. 4). During the operation of the manufacturing device 1, a component S is manufactured on the construction surface 7, wherein the first manufactured layer of the component 8 is connected to the construction surface 7. The connection of the component carrier 3 to a transport device 9 can be established and released by means of a gripper device. For this purpose, the component carrier 3 comprises a mechanical interface 10. The mechanical interface 10 is formed by a slot 11 for accommodating a coupling element on the transport device 9. The slot 11 comprises undercuts for corresponding projections or extendable clamps of the gripper device or generally for a coupling element on the movable arm 12 of the transport device 9. The coupling element can be inserted horizontally into slot 11 until it hits an end stop. The component carrier 3 can then be lifted off the container 5 along with the transport device 9 and the container 5 can thus be opened.

In a method for post-processing a component manufactured according to an additive manufacturing process, a component 3 connected to the component carrier 3 via support structures 8' is accommodated in a workspace 13 in the container 5 after manufacturing and transported in said container, wherein the component carrier 3 seals the workspace 13 against resin and/or solvent and/or uv radiation, and thus largely shields the component 8 from harmful external influences.

FIGS. 2 to 4 show different component carriers 3 and containers 5 in more detail, whereby, to avoid repetition, the same reference signs have been used for functionally identical parts and the commonalities are described in the following for all the variants. The component carrier 3 comprises a construction surface 7 and a sealing surface 14 which radially surrounds the construction surface 7 (see FIGS. 3 and 4). The component carrier 3 is UV-opaque. The container 5 has a base 15, four side walls 16 and an opening 17 opposite to the base 15. The base 15 and the side walls 16 are UV-opaque. The upper edges of the side walls 16 adjacent to the opening 17 respectively comprise a sealing strip 18, wherein four sealing strips 18 together form a seal 19 in the form of a closed frame, which radially (in relation to a center axis perpendicular to the base 15) surrounds the opening 17. The seal 19 is disposed in a plane parallel to the base 15, so that, in the sealing position shown in FIG. 4, in which the component carrier 3 tightly closes the container 5, the construction surface 7 of the component carrier 3 is disposed parallel to the base 15 of the container 5. The sealing surface 14 of the component carrier 3 is sealed with a corresponding sealing surface of the container 5, more specifically the seal 19 of the container 5, against the escape of a photoreactive resin and/or a washing fluid and/or UV radiation from the container 5. On an upper side 20 facing away from the construction surface 7, the component carrier 3 according to FIG. 4 comprises a mechanical interface 10 for a releasable connection to a transport device 9.

Figure 5:
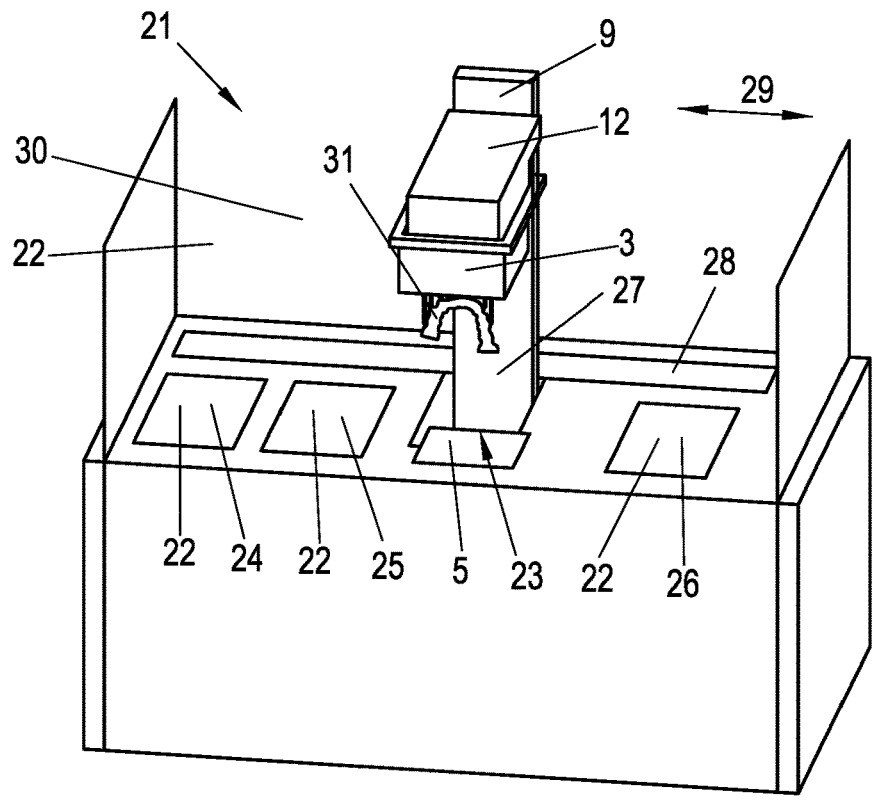
FIG. 5 schematically a manufacturing system having several workstations and having a transport device.

FIG. 5 shows a manufacturing system 21 with several workstations 22 for washing, drying and post curing a component. The manufacturing system 21 includes a component carrier 3 and a container 5 according to FIG. 4, which is disposed in a work area 23 that can be used for loading the component carrier 3 and the container 5 as well as for dripping off and drying excess solvent, in addition to the work area 23, the manufacturing system 21 comprises several workstations 22. Two workstations 22 each comprise a washing tank 24, 25. A third workstation 22 is a post curing chamber 26 for thermal post curing of a component using a controllable heater. In the course of post-processing, the temperature in the workspace of the post curing chamber 26 is increased to a post curing temperature of preferably 50° C.-90° C., in order to thermally cure the component independent of optionally additionally provided UV light (see FIG. 7). The manufacturing system 21 further includes a transport device 9 and the component carrier 3 is connected to the transport device 9. The transport device 9 comprises a drive for horizontal and vertical movement.

To use the manufacturing system shown in FIG. 5, the container 5 is inserted into the work area 23. A gripper on the movable arm 12 of the transport device 9 can now be moved by means of the z-tower 27 of the transport device 9 in order to couple to the component carrier 3. In the coupled state, the component carrier 3 can be moved up into a collision-free work area via the z-tower 27 (this position is shown in FIG. 5). The z-tower 27 can be moved in both directions 29 along a horizontal x-axis 23 starting from the work area 23. After reaching the upper position on the z-tower 27, the component carrier 3 can be driven to the individual workstations 22 according to a preselected program. The workstations 22 are formed by the first washing tank 24, the second washing tank 25, the drying area 30 above the washing tanks 24, 25 and the post curing chamber 26. The necessary post-processes are also carried out in the abovementioned sequence. For the first washing process, the component carrier 3 is positioned above the first washing tank 24 and, after automatic opening of a lid of the washing tank 24, is placed onto the first washing tank 24 by being lowered via the z-tower 27. In doing so, an additively manufactured component 31 attached to the component carrier is submerged into the solvent in the first washing tank 24. In doing so, the component carrier 3 closes the first washing tank 24. In both the first washing tank 24 and in the second washing tank 25 there is a mechanical stirrer, which ensures a relative movement between the additively manufactured component 31 attached to the component carrier 3 and the solvent filled therein. The direction of rotation and the rotational speed of the mechanical stirrer can be set in accordance with the process requirements. After the completion of the first washing process, the component carrier 3 is moved on the z-tower 27 back up into the drying area 30. After a defined drip time, the component carrier 3 is moved along the x-axis 28 to the second washing tank 25 and the second washing process is initiated in the same way as the first washing process. Washing, dripping off and drying times can respectively be defined differently, e.g. as a function of the material and/or the geometry of the component. After the second washing process, a drying process follows, in which the solvent is completely removed from the surface of the component carrier 3 and the attached, additively manufactured component 31.

Only then is the component carrier 3 moved toward and lowered into the post curing chamber 26. In order to avoid oxygen inhibition (i.e. wherein the presence of oxygen prevents curing), the post curing chamber 26 can be flooded with nitrogen. For this purpose, the post curing chamber 26 comprises a corresponding connection. The post curing chamber 26 further comprises lighting means (lamps or LEDs), which emit UV light in the desired wavelength range. The temperature in the post curing chamber 26 can additionally be regulated by means of active or passive heating and cooling. For the post curing process, the post curing chamber 26 is first flooded with nitrogen and set to the desired temperature. The UV emitting lighting means are then switched on for a defined period of time. The post curing in the additively manufactured component 31 attached to the component carrier 3 is now carried out during the time in which they are switched on. The control of the post curing process can take place such that UV radiation and/or heat is applied. After completion of the post curing, the component carrier 3 is moved back to the container 5 and placed upon it. The user can now remove the container 5 with the component carrier 3 placed upon it. The component carrier 3 can now be removed from the container 5. The additively manufactured component 31 attached to the component carrier 3 can now be removed from the component carrier 3 for mechanical finishing.

According to a further exemplary embodiment, the manufacturing system 21 according to FIG. 5 can additionally include a manufacturing station similar to the manufacturing device 1 having a resin vat 2 and an exposure device with spatial resolution shown in FIG. 1. In this case, the component carrier 3 can be transported directly from the manufacturing station to the first washing station by the transport device 9.

According to a further exemplary embodiment, the manufacturing system 21 can additionally comprise an outer housing in accordance with FIG. 5. All the devices shown in FIG. 5 can be accommodated in the outer housing. This allows additional external shielding by the outer housing to be achieved, which, for example, at least temporarily counteracts an exchange of air with the surroundings and/or an entry and/or exit of radiation. The outer housing can comprise a door for inserting and removing the container 5 in a closed state. The outer housing can function like an airlock between the interior of the container 5 and the environment.

Figure 6:
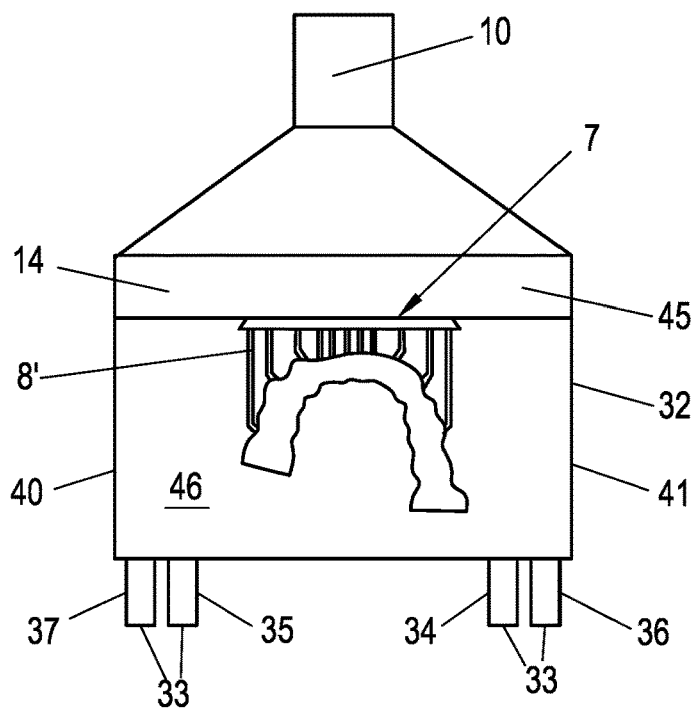
FIG. 6 schematically a sealed container having media connections.
Figure 7:
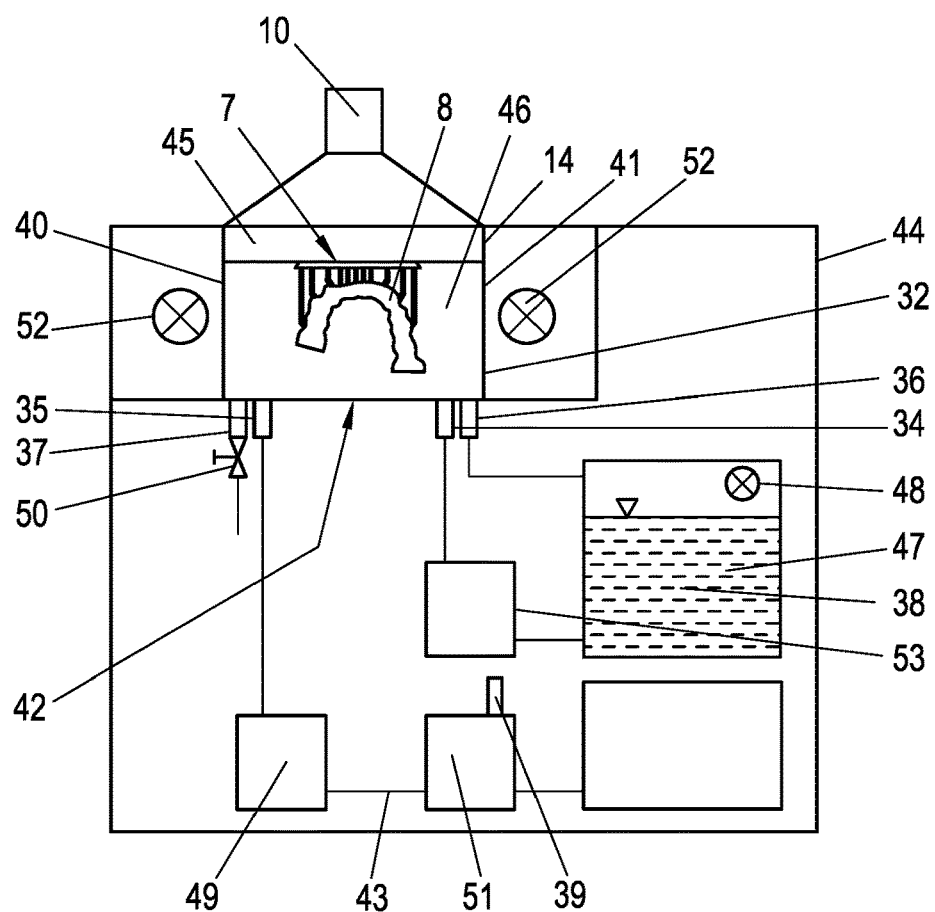
FIG. 7 schematically a container according to FIG. 6 docked into a workstation.

FIGS. 6 and 7 show another, alternative exemplary embodiment. The container 32 shown in FIG. 6 comprises four media connections 33. Two connections 34, 35 are respectively provided for a supply line and two connections 36, 37 for a discharge line of a washing fluid 38 or a drying gas 39. This container 32 comprises two vertical side walls 40, 41 (left and right in the drawing), which are UV-transparent. The two other vertical side walls are UV-opaque. This embodiment of the container 32 is initially handled in the additive manufacturing device 1 in exactly the same way as the previously described container 5 without connections. After that, however, the container 32 with connections 33 simultaneously forms the process chamber for the respective post-processes in a single workstation 42 (see FIG. 7). The media, such as a solvent for washing (e.g. IPA/isopropyl alcohol, ethanol, ester-based or surfactant solution), that are used for post-processing, air for drying and nitrogen for post curing can be supplied and removed via the connections 33.

The manufacturing system 21 according to FIG. 7 comprises a workstation 42 for post-processing, including optical post curing, of a component 8. The workstation 42 for post curing comprises a shielding gas supply 43. The workstation 42 is formed by an additional device 44, which can be used as an accessory to an additive manufacturing device 1. The container 32 is docked into the additional device 44. When docking the container 32, it must be ensured that all connections 33 are connected tightly to the additional device 44. After the sealing docking, the required post-processes can be performed one after the other, in the first step, the component 8 can be washed in the container 32. To do this, the workspace 46 in the container 32 and sealed by the component carrier 45 is flooded in the first step with solvent for washing. A washing fluid 38 is fed into the workspace 46 via a first connection 34 and removed via a second connection 36. The inflow and circulation creates the desired relative movement between the solvent and the additively manufactured component 8 attached to the component carrier 45. The washing time has been determined with the aid of preliminary tests. The solvent itself is stored in a sufficiently dimensioned tank 47 and circulated between the tank 47 and the workspace 46 during the washing process by means of a circulating pump 53. The returning solvent can optionally be filtered at the tank inlet. In order to simplify the subsequent filtering with a particle filter, the dissolved resin residues can be solidified by means of a UV light source 48. After the completion of the washing process, the component 8 is dried in the workspace 46 that is sealed by the component carrier 45. To do this, the container 32 is emptied completely and flushed with air for the subsequent drying process by introducing an air stream into the workspace 46 via a third connection 35 and removing it via a fourth connection 37. The air for drying is let into the container 32 via a pump 49 and the third connection 35 and discharged again via the fourth connection 37 and a switchable outlet valve 50. Air flushing takes place within a defined drying time. The dried component 8 can then be post cured in the workspace 46 sealed by the component carrier 45. After drying, the container 32 can be filled with nitrogen for post curing. To do this, nitrogen is now fed to the pump 49 via a switch valve 51 instead of air. After filling with nitrogen, the two installed UV lighting means 52 are switched on and the workspace 46 is illuminated through two opposing side walls 40, 41 with UV light. An active manipulation of the post curing temperature is possible both via the gas exchange and via the activation period of the UV lighting means 52; the installation of an additional controllable heater can optionally be provided. After the post curing has taken place, the container 32 can be removed from the additional device 44 with the component carrier 45. Finally then, to remove the chemically cleaned and post cured component 8, the component carrier 45 can be removed from the container 32.

Figure 8:
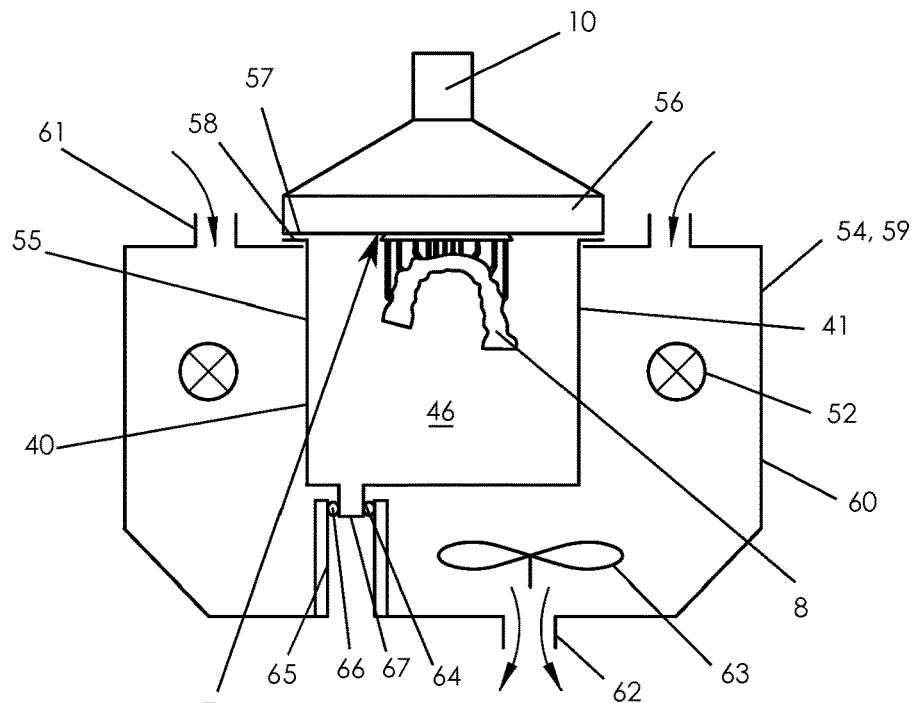

FIG. 8 schematically shows a post curing chamber 54. A container 55 is inserted into the post curing chamber 54. The container 55 and the post curing chamber 54 are sealed by the component carrier 56. The component carrier 56 has a construction surface 7, to which a previously manufactured component 8 is attached. The component carrier 56 has a sealing surface 57. The sealing surface 57 is arranged in the same plane as the construction surface 7 and surrounds the construction surface 7. The sealing surface 57 tightly contacts a corresponding sealing surface 58 of the container 55 formed by a vertical flange at the opening of the container 55, thereby sealing a workspace 46 enclosed by the container 55 and the component carrier 56. The component carrier 56 comprises a mechanical interface 10 arranged on a top side opposite the construction surface 7 and for a releasable connection to a transport device 9.

The post curing chamber 54 comprises two ultraviolet (UV) lighting means 52 arranged between a housing 59 of the post curing chamber 54 and on two opposing sides of the container 55. The ultraviolet lighting means 52 in this embodiment are flashlights, each providing a power of a hundred watts (2×100 W). The inner side of the housing 59 facing the ultraviolet lighting means 52 comprises mirror surfaces 60 for reflecting ultraviolet light from the ultraviolet lighting means 52 to the receptacle for the container 55. The housing 59 comprises two air inlets 61 on its topside, above the two ultraviolet lighting means 52. On the bottom of the housing 59 there is an air outlet 62 (exhaust). Between the air inlets 61 and the air outlet 62, a cooling fan 63 is arranged inside the housing 59. The cooling fan 63 provides for an airflow through the air inlets 61 into the housing 59 and through the air outlet 62 out of the housing 59. The airflow cools the ultraviolet lighting means 52 as well as the container 55 and the housing 59.

The container 55 comprises a connection 64 for a supply line 65 of the post curing chamber 54. The supply line 65 is provided to flood the container 55 with nitrogen through the connection 64 when the container 55 is inserted into the post curing chamber 54. The nitrogen supply can be used to remove oxygen from the workspace 46 or to avoid the entry of oxygen from the environment in order not to disturb the post curing process. The connection 64 comprises a sealing ring 66 and optionally a check valve 67.

When performing post curing of a component 8, the container 55 is sealed with the component carrier 56 and inserted into the post curing chamber 54 and the connection 64 coupled to the supply line 65. The pressure of the nitrogen provided through the supply line 65 is chosen such as to remove oxygen from the workspace 46 by slightly lifting the component carrier 56 off the container 55 and releasing the overpressure between the sealing surfaces 57, 58. After this purging process, the two ultraviolet lighting means 52 are flashed a predefined number of times, thereby illuminating the workspace 46 through two of the sidewalls 40, 41 of the container 55, which sidewalls are uv-transparent. The housing 59 and the component carrier 56 are UV-opaque. During this post curing procedure, the cooling fan 63 provides an airflow through the housing 55.

Figure 9:
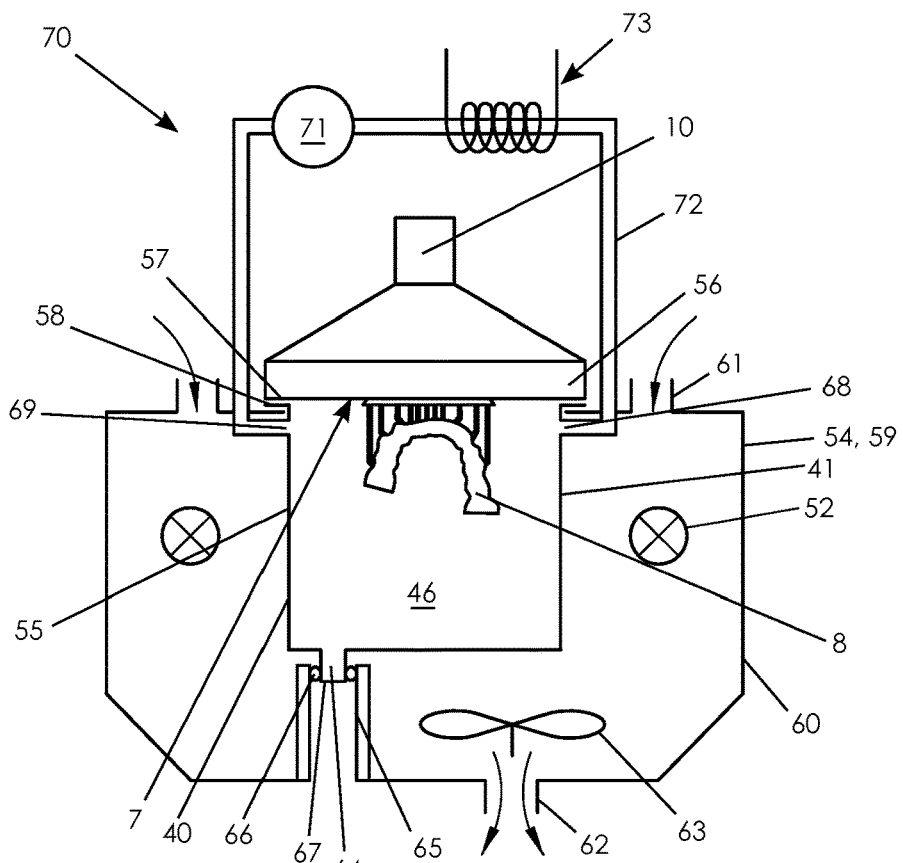
FIG. 9 schematically a post curing chamber with an inserted container and having a convection heater.

FIG. 9 shows an extended embodiment of the container 55 inserted in the post curing chamber 54. For all elements described in connection with FIG. 8 the same reference signs are used in FIG. 9 and it is referred to the above description to avoid repetition. In addition, the container 55 comprises two connections 68, 69 for a convection heater 70. The convection heater 70 is provided to heat the fluid (e.g. mostly nitrogen) enclosed in the workspace 46. By heating said fluid, thermal post curing of the component 8 is performed. The convection heater 70 comprises a pump 71 (or fan) arranged in a fluid circuit 72 connected to the connections 68, 69 of the container 55. The pump 71 circulates the fluid enclosed in the workspace 46 past a heating element 73, e.g. a heater spiral.

Figure 10:
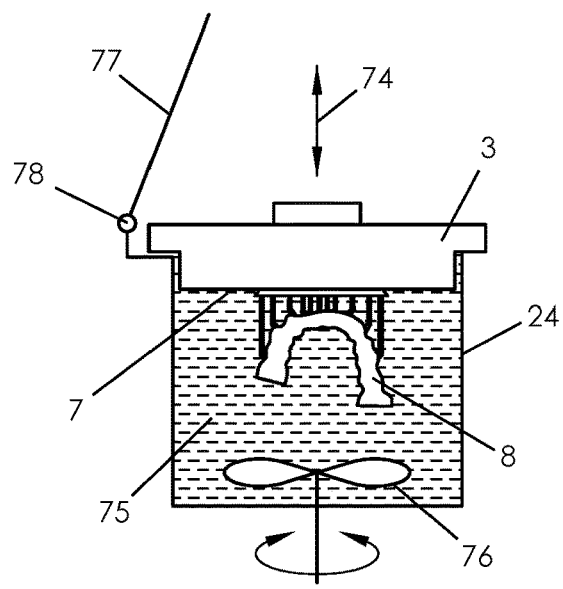
FIG. 10 a component carrier on a washing tank having an integrated stirrer and an additional lid.

FIG. 10 shows a washing tank 24 according to FIG. 5 in more detail, albeit still schematically. The washing tank 24 is sealed by the component carrier 3. As indicated by arrow 74, the component carrier 3 can be lifted from the washing tank in a vertical direction or descended onto the washing tank 24 in a vertical direction. The component carrier 3 has a construction surface 7, to which the component 8 is attached after manufacturing the same in an additive manufacturing device. The washing tank 24 is filled with a washing fluid 75. For washing the component 8, a circulation of the washing fluid 75 within the washing tank is provided by a mechanical stirrer 76, in this example having rotating blades. When the washing tank 24 is not in use, i.e. there is no component 8 immersed in the washing fluid 75, the washing tank 24 is closed with a lid 77 attached to the washing tank 24 via a hinge 78. Optionally, the hinge 78 can be coupled to a drive to automatically open the lid 77 when a component carrier 3 with a component 8 is approaching the washing tank 24.

Figure 11:
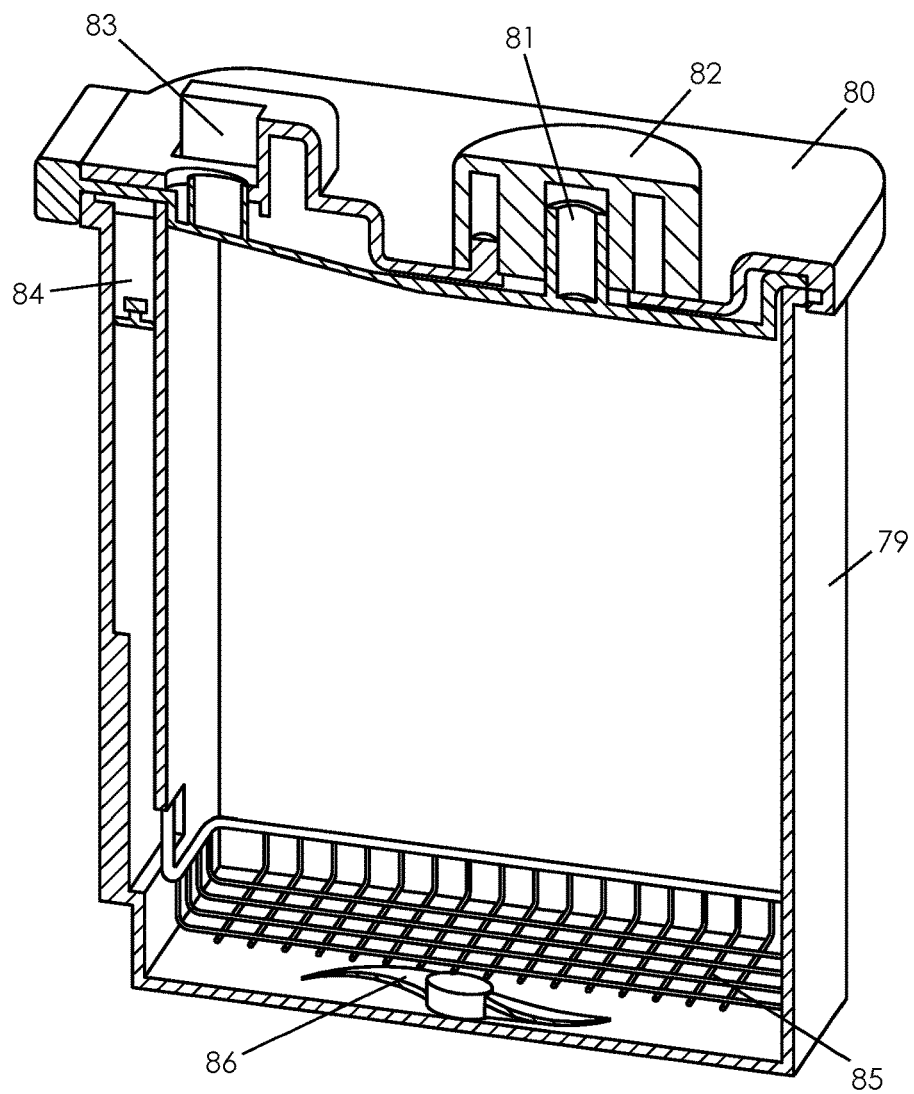
FIG. 11 schematically a washing tank closed with a lid without an inserted component carrier.

FIG. 11 shows a different embodiment of a washing tank 79, which is shown in a standby configuration, i.e. without an inserted component carrier or component. In this configuration, the lid 80 seals the washing tank 79. The lid 80 comprises a refill opening 81 covered by a screw cap 82. The refill opening 81 is provided for filling washing fluid into the washing tank 79. A mechanical interface 83 for opening the lid 80 is arranged next to the screw cap 82. In one of the vertical walls, a level sensor 84 is provided in the form of a float switch for sensing the level of washing fluid inside that washing tank 79. Based on the output of the level sensor 34, a warning may be issued that there washing tank 79 requires a refill of washing fluid. At the bottom of the washing tank 79 a basket 85 is provided above the mechanical stirrer 86 for protecting the mechanical stirrer 86 from components that may detach from a component carrier arranged on the washing tank 79.

The invention claimed is:

1. A manufacturing system comprising:
   a stereolithographic additive manufacturing device that further comprises:
      a resin vat and an exposure device with spatial resolution;
      a self-contained unit which comprises: a component carrier including a construction surface on which a component to be manufactured is disposed during the operation of the stereolithographic manufacturing device, and a sealing surface which radially surrounds the construction surface;
      a container including a sealing surface; and
      a transport device;
   wherein the component carrier is releasably connected to the transport device,
   wherein the component carrier is configured to be placed onto the container as a lid along with the component to be manufactured so as to cover and close and seal the container,
   wherein the sealing surface of the component carrier and the sealing surface of the container are further configured to seal together against an escape of a photoreactive resin, a washing fluid, and UV (ultraviolet) radiation from the container,
   wherein the container is removably attached to the stereolithographic additive manufacturing device,
   wherein on a side facing away from the construction surface, the component carrier comprises a mechanical interface configured to releasably connect with the transport device or a first workstation of one or more workstations,
   wherein the mechanical interface is formed by a slot which comprises undercuts for corresponding projections or extendable clamps of a gripper device or for a coupling element on a movable arm of the transport device.

2. The manufacturing system according to claim 1, wherein the transport device, comprises a drive which is configured to move horizontally.

3. The manufacturing system according to claim 1, wherein the container is partially UV-transparent.

4. The manufacturing system according to claim 1, wherein the one or more workstations are each configured to wash, dry or post cure a component.

5. The manufacturing system according to claim 1, further comprising:
   additional functional work areas, which are configured to load the component carrier and the container and to drip off and dry excess solvent.

6. The manufacturing system according to claim 1, wherein the container is a washing tank and comprises a stirrer configured to move a solvent filled therein.

7. The manufacturing system according to claim 1, wherein at least one workstation of the one or more workstations is configured to cure a component, wherein the at least one workstation is configured to perform optical and/or thermal post curing.

8. The manufacturing system according to claim 7, wherein the at least one workstation comprises a protective gas supply.

* * * * *